United States Patent [19]
Sorin et al.

[11] Patent Number: 4,986,624
[45] Date of Patent: Jan. 22, 1991

[54] OPTICAL FIBER EVANESCENT GRATING REFLECTOR

[75] Inventors: Wayne V. Sorin; Herbert J. Shaw, both of Stanford, Calif.

[73] Assignee: The Board of Trustees of the Leland Stanford Junior University, Stanford, Calif.

[21] Appl. No.: 147,095

[22] Filed: Jan. 20, 1988

Related U.S. Application Data

[63] Continuation of Ser. No. 754,271, Jul. 15, 1985, abandoned.

[51] Int. Cl.$^5$ .................................................. G02B 6/34
[52] U.S. Cl. .............................. 350/96.19; 350/162.23
[58] Field of Search ............... 350/96.15, 96.16, 96.19, 350/162.17, 162.23, 96.29; 372/6; 250/227; 455/610, 612

[56] References Cited

U.S. PATENT DOCUMENTS

| | | | |
|---|---|---|---|
| 3,891,302 | 6/1975 | Dabby et al. | 350/96.12 |
| 4,268,116 | 5/1981 | Schmadel et al. | 350/96.29 |
| 4,358,851 | 11/1982 | Scifres et al. | 350/96.15 |
| 4,749,246 | 6/1988 | Epworth et al. | 350/96.15 |
| 4,781,428 | 11/1988 | Epworth et al. | 350/96.19 |

FOREIGN PATENT DOCUMENTS

| | | | |
|---|---|---|---|
| 2506954 | 12/1982 | France . | |
| 54-70279 | 12/1980 | Japan . | |
| 2125572A | 3/1984 | United Kingdom | 350/96.15 |
| 2155621A | 9/1985 | United Kingdom | 350/96.15 |
| 2161648 | 1/1986 | United Kingdom . | |
| 2161609 | 10/1986 | United Kingdom . | |

OTHER PUBLICATIONS

Bergh et al., Electronics Letters, vol. 16, No. 7, Mar. 27, 1980, "Single-Mode Fiber Optic Directional Coupler", p. 260-1.
Youngquist et al., "Two-Mode Fiber Modal Coupler", Optics Letters, vol. 9, No. 5, May 1984.
Alferness, R. C., et al., InGaAs/InP Waveguide Grating Filters for $\lambda=1.5$ $\mu$, Applied Physics Letters, vol. 45, No. 12, Dec. 15, 1984, pp. 1278-1280.
Dabby, F. W., et al., Periodic Dielectric Waveguides, Optics Communications, vol. 6, No. 2, Oct. 1977, pp. 125-130.
Flanders, D. C., et al., Grating Filters for Thin-Film Optical Waveguides, Applied Physics Letters, vol. 24, No. 4, Feb. 15, 1974, pp. 194-196.
P. St. J. Russell, et al., "Grating-Fiber Coupler as a High-Resolution Spectrometer," Optics Letters, vol. 10, No. 6, Jun. 1985, pp. 291-293.
N. Imoto, A Grating Filter for Embedded Silica Waveguides, International Conference on Integrated Optics and Optical Fiber Communications, 83, paper 29AZ-3, Tokyo, Japan, Jun. 1983.
B. S. Kawasaki, et al., Narrow Band Bragg Reflectors in Optical Fibers, Optics Letters, vol. 3, No. 2, Aug. 1978, pp. 66-68.
Matsuhara, M., et al., Optical Waveguide Band Rejection Filters: Design, Applied Optics, vol. 13, No. 12, Dec. 1974, pp. 2886-2888.
Russell, P. St. J., Single Mode Fiber Grating Spectrometer/DE Multiplexer, 7th Topical Meeting on Integrated and GuideWave Optics, paper PD3, 1984.
Yariv, A., et al., Periodic Structures for Integrated Optics, IEEE Journal of Quantum Electronics, vol. QE-13, No. 4, Apr. 1977, pp. 233-253.
Hill, et al., "Sensitivity in Optical Fiber Waveguides: Application to Reflection Filter Fabrication", Applied Physics Letters, vol. 32, pp. 647-649, 1978.
Sorin et al., "A Single-Mode Fiber Evanescent Grating Reflector", Journal of Lightwave Technology, vol. LT-3, No. 5, Oct. 1985, pp. 1041-1043.

Primary Examiner—Frank Gonzalez
Attorney, Agent, or Firm—Knobbe, Martens, Olson & Bear

[57] ABSTRACT

A periodic grating structure is placed on a facing surface formed on an optical fiber so that the grating structure is within a portion of the evanescent field of an optical signal propagating through the optical fiber. The spatial periodicity of the grating structure is selected to be equal to one-half the propagation wavelength of the optical signal. The grating structure causes the optical signal to be reflected at an angle of 180 degress and thus to propagate in a reverse direction from its original direction of propagation.

19 Claims, 3 Drawing Sheets

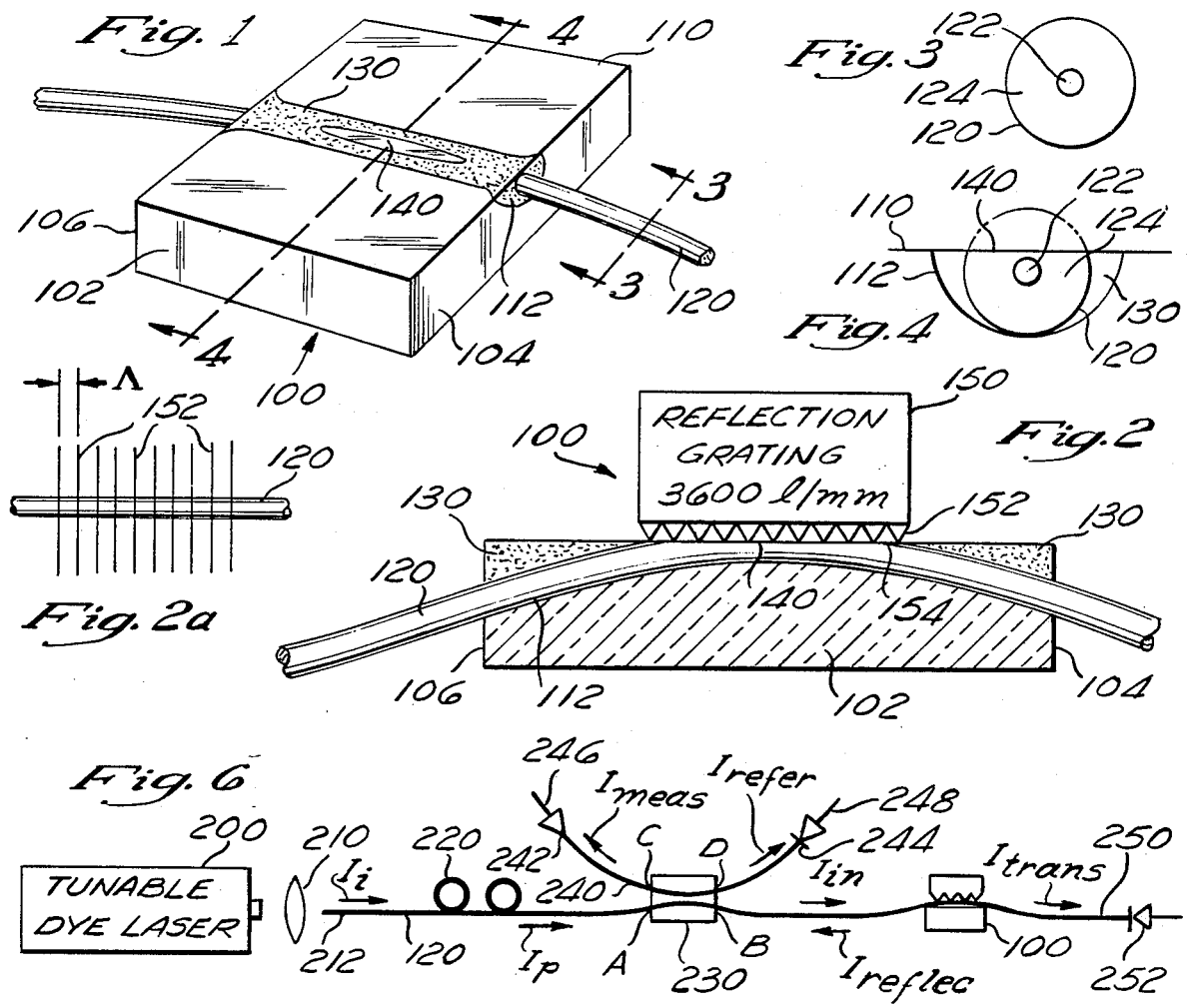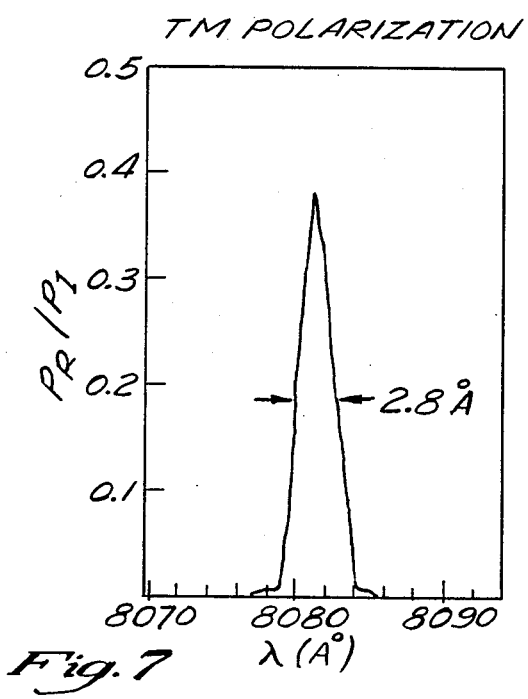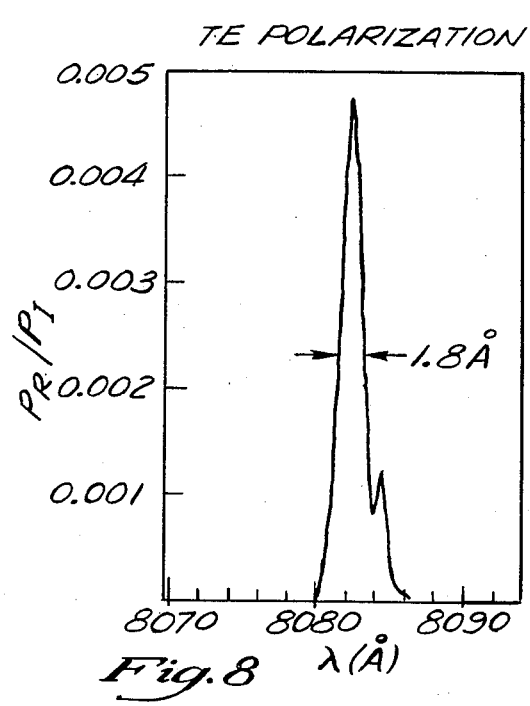

OPTICAL FIBER EVANESCENT GRATING REFLECTOR

This application is a continuation of application Ser. No. 754,271, filed July 15, 1985 (abandoned).

FIELD OF THE INVENTION

The present invention relates generally to the propagation of optical signals in optical fibers and more particularly to a device for reversing the direction of propagation of optical signals within an optical fiber.

BACKGROUND OF THE INVENTION

Optical fibers are being used with increasing regularity for the transmission and processing of optical signals. A number of devices have been developed to couple light between optical fibers, to modulate optical signals in optical fibers, to amplify optical signals in optical fibers, and the like. However, a need exists for a in-line device for reversing the direction of optical signals in optical fibers without splicing the optical fiber. Additionally, a need exists for a frequency sensitive reflector which can be used as a component of an optical fiber system, such as a communications network.

SUMMARY OF THE INVENTION

The present invention comprises a device for providing 180 degree reflection of an optical signal. The invention includes an optical fiber, having a core and cladding. In one preferred embodiment, the optical fiber is a single-mode optical fiber. A portion of the cladding is removed to form a facing surface on the optical fiber, intermediate to the ends of the optical fiber. A periodic structure is located in contact with the facing surface formed on the cladding. The periodic structure has a spatial periodicity (i.e., a distance between corresponding locations on the periodic structure) which is chosen as a function of the propagation wavelength of the optical signal which is to be reflected. The spatial periodicity, $\Lambda$, is determined as follows:

$$\Lambda = \frac{\lambda_0}{2 \times n_{eff}}$$

where $\lambda_0$ is the vacuum wavelength of the optical signal and $n_{eff}$ is the effective index of the optical fiber for the guided mode which is reflected.

In one preferred embodiment of the present invention, the periodic structure comprises an external holographic reflection grating. When this type of grating is used, an index matching oil is preferably applied between the facing surface and the holographic reflection grating to fill air gaps between the grating and the facing surface to maximize the extent of the evanescent field penetration towards the grating. Sufficient pressure is preferably applied to the holographic reflection grating to ensure contact between the grating and the facing surface.

In an alternative preferred embodiment of the present invention, the periodic structure comprises a series of grooves fabricated directly on the facing surface of the fiber The grooves are formed by exposing a photoresist by holographic lithography and then etching the facing surface.

The present invention also includes a method of manufacturing a fiber optic evanescent field reflector for providing 180 degree reflection of an optical signal. The method comprises the steps of forming a facing surface on the cladding of an optical fiber which has an inner core and an outer cladding. A periodic grating structure is placed on the facing surface of the fiber in contact with the cladding. The periodic grating structure has a periodicity chosen to match the propagation wavelength of the optical signal. In one preferred embodiment, the periodic grating structure is an external holographic reflection grating. In an alternative preferred embodiment the periodic structure is formed by etching a series of grooves on the facing surface of the fiber.

BRIEF DESCRIPTION OF THE DRAWINGS

FIG. 1 illustrates an optical fiber coupler half as used in the present invention.

FIG. 2 illustrates a partial cross-sectional elevation view of one embodiment of the apparatus of the present invention showing a pictorial representation of a metallic reflection grating mounted on the facing surface of the fiber.

FIG. 2a is a pictorial representation of a plan view of the grating coupler in FIG. 2, showing the perpendicular relationship of the ridges and grooves of the grating to the axis of the optical fiber.

FIG. 3 illustrates a cross-sectional view of the fiber taken along the lines 3—3 in FIG. 1.

FIG. 4 illustrates a partial cross-sectional view of the coupler half taken along the lines 4—4 in FIG. 1.

FIG. 6 illustrates an experimental system for measuring the percentage of reflection and the percentage of transmission of optical signals in an optical fiber reflection grating built in accordance with the present invention.

FIG. 7 is a graphical representation of the percentage of reflection of an optical signal propagating in the transverse magnetic (TM) polarization mode with respect to the surface of the metallic reflection grating at wavelengths around the resonant wavelength of the reflection grating.

FIG. 8 is a graphical representation of the percentage of reflection of an optical signal propagating in the transverse electric (TE) polarization mode with respect to the surface of the metallic reflection grating at wavelengths around the resonant wavelength of the reflection grating.

DETAILED DESCRIPTION OF THE PREFERRED EMBODIMENT

Figure 5A:
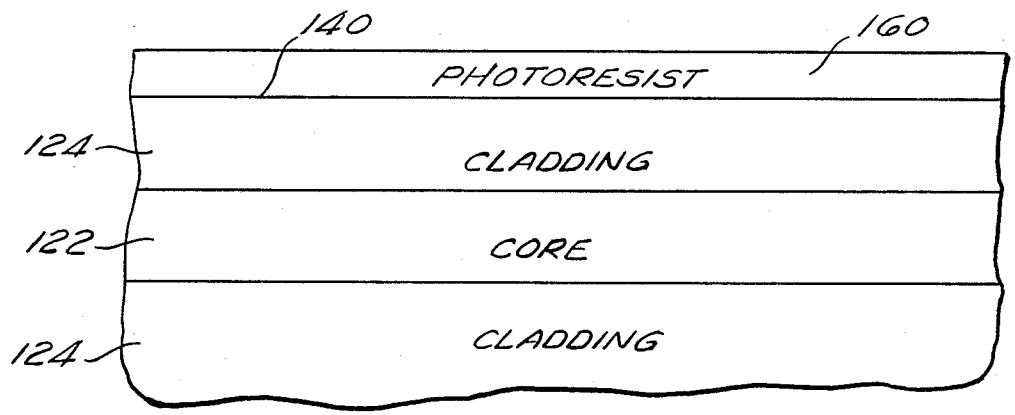
FIG. 5a is a cross-sectional view of a segment of the optical fiber showing a layer of photoresist applied to the facing surface of the fiber.

FIG. 1 shows an optical fiber coupler half 100 which is utilized in the preferred embodiment of the present invention. The coupler half 100 comprises a quartz block 102 which has two end surfaces 104 and 106 and a flat top surface 110. A substantially straight slot 112 is cut or etched on the flat top surface 110 between the two end surfaces 104 and 106 such that the depth of the slot 112 with respect to the top surface 110 is greater near the two end surfaces 104 and 106 than it is in the middle of the top surface 110 midway between the two end surfaces 104 and 106. Preferably, the depth of the slot 112 varies gradually such that the slot 112 is arcuate between the two end surfaces 104 and 106, as seen in a partial cross-sectional elevation view in FIG. 2.

An optical fiber 120, which is preferably a single-mode optical fiber, is placed in the slot 112 with the axis of the optical fiber 120 extending between the two end surfaces 104 and 106. As shown more clearly in FIG. 3, in a view taken along the lines 3—3 in FIG. 1, the optical fiber 120 has an inner core 122 and an outer cladding 124. The inner core 122 has a higher refractive index than the outer cladding 124, such that light propagating within the inner core 122 of the optical fiber 120 is guided. The depth of the slot 112 in FIGS. 1 and 2 is selected so that at the end surfaces 104 and 106 the depth is greater than the diameter of the outer cladding 124 of the optical fiber 120. The depth of the slot 112 at the approximate midpoint of the slot between the end surfaces 104 and 106 is selected so that it is approximately equal to the diameter of the outer cladding 124 of the optical fiber 120. Thus, when the optical fiber 120 is placed in the slot 112, the periphery of the outer cladding 124 is approximately even with the top surface 110 at the approximate midpoint of the slot 112 between the two end surfaces 104 and 106.

The optical fiber 120 is held in place in the slot 112 by an epoxy 130, or other suitable adhesive. Thereafter, the top surface 110 is carefully ground and polished so that the outer cladding 124 of the optical fiber 120 is slowly removed. The grinding and polishing is continued until only a small portion of the outer cladding 124 covers the inner core 122 of the optical fiber 120 at the approximate mid-point of the fiber 120. For example, in a silica optical fiber 120 having an inner core 122 with a diameter of 5 microns and an outer cladding 124 with a diameter of 75 microns, the outer cladding 124 is ground and polished until approximately 0.5-5 microns of the outer cladding 124 covers the inner core 122 at the midpoint of the slot 112. This can be appreciated more fully in FIG. 4 which is taken along the lines 4—4 in FIG. 1 and which shows the facing surface 140 and its relationship to the core 122. The grinding and polishing technique used to partially remove the outer cladding 124 is described in detail in "SINGLE-MODE FIBER OPTICAL DIRECTIONAL COUPLER," R. A. Bergh, et al., Electronics Letters, Vol. 16, No. 7, pages 260-261 (Mar. 27, 1980), and in U.S. Pat. No. 4,493,528, assigned to the assignee of the present application, both of which are incorporated herein by reference.

After the grinding and polishing is completed, the area where the outer cladding 124 has been removed forms a flat oval facing surface 140 which is coplanar with the top surface 110 of the quartz block 102. As explained in detail in U.S. Pat. No. 4,493,528, when an optical signal propagates through the optical fiber 120, a portion of the optical energy (i.e., the evanescent field) of the optical signal will penetrate the facing surface 140. The present invention utilizes a metallic reflection grating 150 on the facing surface so that the metallic reflection grating 150 is within the portion of the evanescent field which penetrates the facing surface 140. One embodiment of the metallic reflection grating 150 is illustrated pictorially in FIG. 2 positioned on the facing surface 140. The metallic reflection grating 150 comprises a block of metal, such as aluminum, which has a series of parallel ridges 152 on one surface. The ridges are placed in contact with the facing surface 140 so that the ridges 152 are perpendicular to the axis of the fiber 120 as illustrated in FIG. 2a. As shown in FIG. 2a, the ridges 152 are periodically spaced from each other, with a substantially constant distance $\Lambda$ between adjacent ridges. The distance $\Lambda$ is referred to hereinafter as the spatial periodicity of the grating 150.

In one preferred embodiment of the present invention, the metallic reflection grating 150 is a commercially available holographic reflection grating having 3600 lines or ridges per millimeter on an aluminum substrate. The 3600 lines per millimeter provides a spatial periodicity of 278 nanometers (i.e., 1 divided by 3600 lines per millimeter equals 278 nanometers between adjacent lines). One such reflection grating is available from IS A, Inc., 173 Essex Avenue, Metuchen, N.J. 08840. Preferably, an index matching oil 154, having a refractive index equal to that of the cladding, is placed between the facing surface 140 and the reflection grating 150 to fill air gaps which might otherwise decrease the extent of the penetration of the evanescent field of the optical signal. Also, a small amount of pressure is preferably applied to the grating to increase the contact of the grating 150 with the facing surface 140.

Figure 5B:
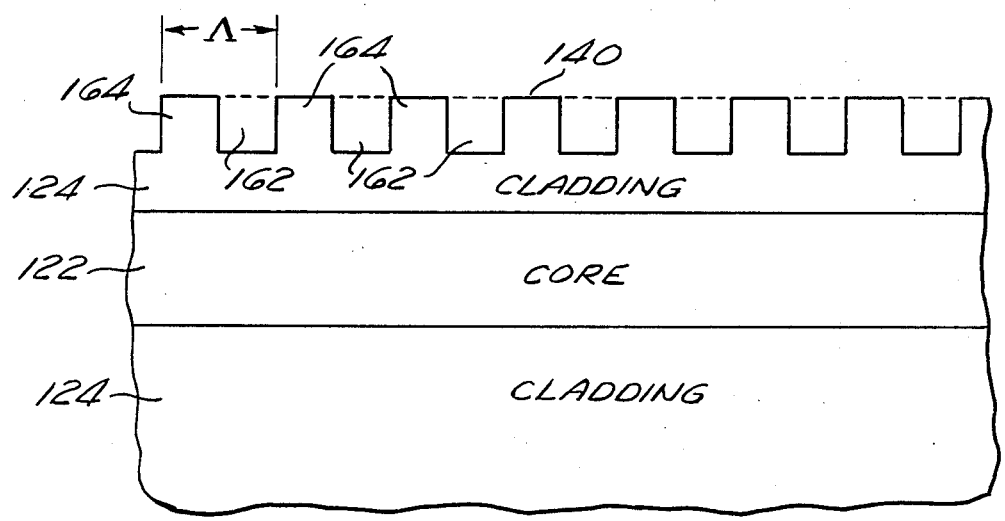
FIG. 5b shows the same surface after the photoresist is holographically exposed and etched to produce grooves in the facing surface.

In an alternative embodiment of the present invention, a reflection grating is fabricated directly on the facing surface 140 by holographically exposing a photoresist on the facing surface 140 and then etching the facing surface with hydrogen fluoride or other suitable etchant to form the lines of the grating. In FIGS. 5a and 5b a small segment of the optical fiber 120 is shown in partial cross-section at a location where a portion of the cladding 124 has been removed to form the facing surface 140. As illustrated in FIG. 5a, a thin layer of photoresist 160 is shown coating the facing surface 140. For example, the photoresist 160 can be Shipley AZ1450B, spin-coated to a depth of approximately 0.1-1.0 micron. In FIG. 5b, the segment of the optical fiber 120 is shown after the photoresist has been holographically exposed and then etched to form a series of periodic grooves 162 in the facing surface 140. The periodic grooves 162 are thus separated by periodic ridges 164. The grooves 162 and ridges 164 are oriented perpendicular to the axis of the optical fiber 120. The spatial periodicity, shown as $\Lambda$, of the grooves can be 3600 lines per millimeter or another value depending upon the wavelength of the optical signal to be reflected, as will be discussed below.

Figure 5C:
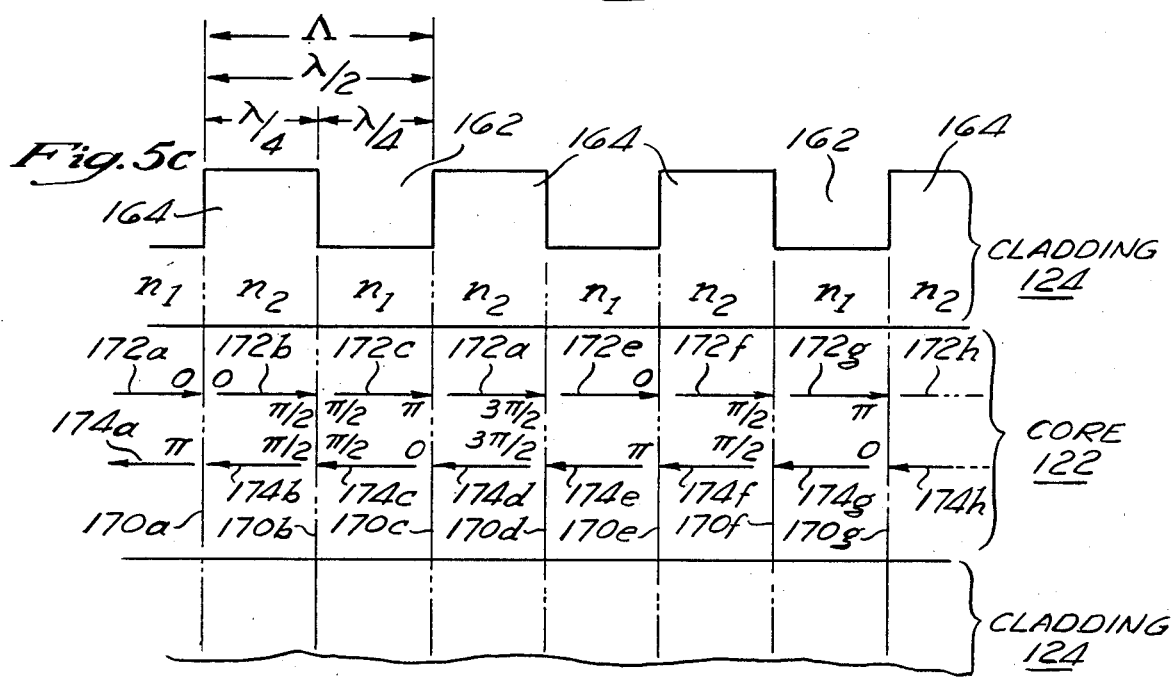
FIG. 5c shows cumulative reflection of an optical signal propagating through the core of an optical fiber.

The operation of the present invention as a reflector for an optical signal is illustrated in FIG. 5c which shows the cross-section of the device as constructed in accordance with FIGS. 5a and 5b. As set forth above, the cladding 124 at the facing surface 140 has been etched to form a series of ridges 164 separated by a series of grooves 162. Each of the ridges 164 and each of the grooves 162 preferably has a width of one-fourth of the propagation wavelength ($\lambda$) of the optical signal to be reflected. The term "propagation wavelength"

used to refer to the wavelength ($\lambda$) of the optical signal in the fiber 120 and should be distinguished from the free-space wavelength $\lambda_0$ of the optical signal. The width of each of the grooves 162 and the ridges 164 is thus shown as $\lambda/4$ in FIG. 5c. The ridges 164 and the grooves 162 thus have a spacial periodicity $\Lambda$ of $\lambda/2$.

The optical fiber 120 has an effective index of refraction $n_{eff}$ which is ordinarily determined by the indices of refraction of the core 122, and the cladding 124. However, when grooves are etched into the cladding as shown in FIG. 5b, so as to expose the evanescent field within the fiber, the effective index also depends on the refractive index of the medium surrounding the cladding 124, which in the preferred embodiment illustrated in FIG. 5b is air. The core 122 has a higher index of refraction than the cladding 124, and the cladding 124 has a higher index of refraction than the surrounding air. The respective thicknesses of the core 122 and the cladding 124 determine the effective index of refraction $n_{eff}$ the optical fiber 120. The alternating grooves 162 and ridges 164 cause the effective index of refraction $n_{eff}$ to vary in the vicinity of the grooves and ridges. For example, at each groove 162, the thickness of the cladding 124 is reduced and the lower refractive index of the air which penetrates the groove causes the effective refractive index of the fiber 120 to be lower in the cross-sectional area adjacent to each groove 162.

This refractive index is shown as $n_1$ in FIG. 5c. The thicker cladding at each ridge 164 causes the effective refractive index $n_2$ in the cross-sectional area adjacent to each ridge 164 to be higher than the refractive index $n_1$. Thus, the fiber 120 can be illustrated as a series of segments, delineated by phantom lines 170, having alternating high refractive indices $n_2$ and low refractive indices $n_1$. The difference between the two effective refractive indices is small but is sufficient to cause reflection as will be explained below.

It is well known that when a light signal is incident upon a boundary between materials having different refractive indices, at least a portion of the light signal will be reflected at the boundary. The percentage of light reflected is determined by the magnitude of the difference in refractive indices with larger magnitudes of differences causing higher percentages of reflection. It is also well known that when a light signal is incident upon such a boundary when travelling in the material having the lower index of refraction, the portion of the light signal reflected at the boundary will undergo a phase change of $\pi$ radian or $\lambda/2$. On the other hand, a light signal travelling in the material having the higher index of refraction will be reflected without a phase change. These two phenomena are advantageously used in the present invention to provide a cumulative reflection in the optical fiber 120 shown in FIG. 5c which is significantly larger than can be achieved by a single reflection.

In FIG. 5c, an optical signal 172 propagating in the core of the fiber 120 is represented by an arrow 172a and is incident upon a boundary 170a between a portion of the optical fiber 120 having the lower index of refraction $n_1$ and a portion of the optical fiber 120 having a higher index of refraction $n_2$. At the boundary 170a, a portion 174a of the incident optical signal 172 is reflected at the boundary 170a and begins propagating in the reverse or backward direction as represented by an arrow 174a. The reflected portion 174a of the incident light comprises a very small percentage of the incident light (i.e., much less than one percent) and most of the incident light continues to propagate in the original direction as a portion 172b represented by an arrow 172b. The portion 172b is incident upon the next boundary 170b where a small portion 174b is reflected and a large portion 172c continues to propagate in the original direction. This is repeated for the total number of boundaries 170 caused by the grooves 162 and the ridges 164 with the forward propagating portions illustrated by arrows 172d, 172e, etc., and the reflected portions illustrated by arrows 174c, 174de, 174e, etc.

The light signal 172a is incident upon the first boundary 170a from a portion of the fiber 120 having the lower index of refraction $n_1$ towards a portion of the fiber having the higher index of refraction $n_2$. Thus, at the boundary 170a, the reflected portion 174a of the light signal will have a $\pi$ radian phase difference from the incident portion 172a. This is illustrated by labeling the incident portion 172a with 0 indicating the reference phase and labeling the reflected portion 174a with $\pi$ to indicate the phase difference. The first non-reflected portion 172b will undergo a $\pi/2$ radian phase change in propagating the 80 /4 distance from the boundary 170a to the boundary 170b. Thus, the non-reflected portion 172b will be incident upon the boundary 170b with a phase of $\pi/2$ radian with respect to the phase of the portion 172a incident upon the boundary 170a. At the boundary 170b, the portion 172b is travelling in a portion of the fiber 120 having the higher refractive index $n_2$ toward a portion of the fiber 120 having the lower refractive index $n_1$. Therefore, the portion 174b reflected from the boundary 170b will be reflected without a phase change and will thus have a phase of $\pi/2$ radian with respect to the phase of the portion 172a incident upon the boundary 170a. The reflected portion 174b will undergo a $\pi/2$ radian phase change as it propagates the distance from the boundary 170b back to the boundary 170a and will thus have a phase of x radian with respect to the portion 172a incident upon the boundary 170a. This is the same phase as the phase of the reflected portion 174a and the reflected portion 174b will therefore constructively add to the reflected portion 174a. Substantially all of the reflected portion 174b will pass through the boundary 170a to add to the reflected portion 174a and a small portion (not shown) will be reflected back toward the boundary 170b.

In like manner, the non-reflected portion 172c is incident upon the boundary 170c where the small portion 174c is reflected. The portion 172c undergoes a $\pi/2$ radian phase change as it propagates from the boundary 170b to the boundary 170c and is thus incident upon the boundary 170c with a phase of $\pi$ radian with respect to the portion 172a at the boundary 170a. Since the portion 172c is propagating from a portion of the fiber 122 with the lower index of refraction $n_1$ to a portion of the fiber 122 with the higher index of refraction $n_2$, the reflected portion 174c will have a phase difference of $\pi$ radian with respect to the portion 172c at the boundary 170c and will thus have a phase of $2\pi$ radian or 0 radian with respect to the phase of the portion 172a incident upon the boundary 170a. The reflected portion 174c will undergo a phase change of $\pi/2$ radian as it propagates to the boundary 170b and will thus have phase of $\pi/2$ radian with respect to the portion 172a incident upon the boundary 170a. Since this is the same phase as the reflected portion 174b at the boundary 170b, the reflected portion 174c will constructively add to the portion 174c. The same analysis for the non-reflected portions 172d, 172e, etc. and the reflected portions 174d, 174e, etc. would show that the reflected portions constructively add at each of the boundaries and thus the light signal in the reverse or backward direction at the boundary 170a will be a sum of all of the reflected signals. If the wavelength of the light signal 172a incident upon the boundary 170a is not equal to the spatial periodicity Λ, the reflected portions will not constructively add to produce a reverse or backward propagating signal of significant magnitude at the wavelength of the incident signal 172a.

The foregoing explanation is equally applicable to the use of the metallic reflection grating 150 described in connection with FIG. 2. The ridges 152 of the grating 152 cause periodic changes in the effective refractive index of the optical fiber 120 and thus causes the periodic reflection at each of the boundaries between the portions of the fiber 120 having each of the refractive indices.

The condition for maximum reflection in the backwards direction occurs when the following equation is satisfied:

$$\Lambda = 1/2\lambda = \frac{\lambda_0}{2n_{eff}} \qquad (1)$$

where $\Lambda$ is the spatial period of the reflection grating, $\lambda_0$ is the vacuum wavelength of the optical signal, $n_{eff}$ is the effective index of the guided mode of the optical fiber 120, and $\lambda$ is the propagation wavelength of the optical signal. In the exemplary embodiment described herein, the optical fiber 120 has an effective index of approximately 1.456; and the spatial period of the reflection grating is approximately 278 nanometers. Thus, solving Equation (1) for the wavelength of the optical signal, one can predict that the exemplary embodiment will be most effective at reflecting light at a wavelength $\lambda_0$ of approximately 8082 Angstroms.

FIG. 6 illustrates an experimental set up to measure the effectiveness of the apparatus of the present invention in reflecting optical signals. The experimental setup utilizes a light source 200 for generating optical signals at a wavelength which can be varied, such as a continuous wave dye laser having Exciton LDS 821 dye which produces tunable polarized radiation from 790 to 900 nanometers (7900 to 9000 Angstroms). The light output from the light source 200 is focused for input into a first end 212 of the optical fiber 120 using a lens 210 or other known techniques. An in-line polarization controller 220, such as is described in U.S. Pat. No. 4,389,090, is included adjacent the first end 212 to control the polarization of the light in the optical fiber 120, so that the effect of different polarizations on the reflection characteristics of the present invention can be determined.

After passing through the polarization controller 220, the optical fiber 120 passes through two ports of a four port optical coupler 230 such as the one described in "SINGLE-MODE FIBER OPTICAL DIRECTIONAL COUPLER," R. A. Bergh, et al., Electronics Letters, Vol. 16, No. 7, pages 260-261 (Mar. 27, 1980), and in U.S. Pat. No. 4,493,528. The optical coupler 230 provides a means for comparing the intensity of the reflected light with the intensity of the incident light. The optical coupler has four ports labelled as A, B, C and D in FIG. 6. The optical fiber 120 enters the optical coupler 230 at the port A and exits the optical coupler 230 at the port B. The optical fiber 120 thus provides a direct propagation path between ports A and B. A second optical fiber 240 extends from port C of the coupler 230 to port D. The coupler 230 juxtaposes the fibers 120, 230 at an interaction region to provide evanescent field coupling therebetween. Accordingly, light entering the coupler 230 at port A will be coupled from the optical fiber 120 to the second optical fiber 240 such that the light exits the coupler at port D. Similarly, light entering the coupler 230 at port B will be coupled from the optical fiber 120 to the optical fiber 240 such that the light exits the coupler 230 at port C. Preferably, the coupling ratio of the coupler 230 is approximately 0.01 so that approximately 99 percent of the light input to the optical coupler 230 via the optical fiber 120 remains in the optical fiber 120. Only one percent of the light is coupled from the fiber 120 to the second optical fiber 240.

The second optical fiber 240 has a first end 242 which is proximate to the port C and has a second end 244 which is proximate to the port D. Detectors 246, 248 are disposed at the ends 242, 244, respectively, for measuring light output from the ports C and D, respectively of the coupler 230.

The optical fiber 120 interconnects the port B of the optical coupler 230 with the evanescent field grating reflector 100, discussed in reference to FIGS. 1-4. The optical fiber 120 extends through the grating reflector 100 as described above and terminates at a second end 250. A photodetector 252 is disposed at the end 250 for measuring light output therefrom.

The operation of the experimental setup shown in FIG. 6 to determine the percentage of light reflected is as follows. The light incident upon the end 212 of the fiber 120 is represented by an arrow $I_i$. The incident light $I_i$ first passes through the polarization controller 220 where the polarization of the light input to the grating reflector 100 can be adjusted to a desired polarization state. The light exits the polarization controller 220 as light $I_p$. The light $I_p$ then enters port A of the coupler 230. Approximately, 99 percent of the light which enters port A of the coupler 230 exits the coupler 230 via port B and continues in the fiber 120 as light to be input to the grating reflector 100. This light is represented by an arrow $I_{in}$. The other one percent of the light which enters port A of the coupler 230 is coupled to the fiber 240 and exits the coupler 230 via the port D as indicated by an arrow $I_{refer}$. The light $I_{refer}$ propagates to the second end 244 of the fiber 240 and is detected by the detector 248. The magnitude of the light detected by the detector 248 is directly proportional to the light $I_{in}$ which is input to the grating reflector 100. Thus, the magnitude of the light $I_{refer}$ detected by the detector 249 is used to determine the magnitude of the light input to the grating reflector 100. In the example presented herein, the light $I_{in}$ will have an intensity of approximately 99 times the intensity of the light $I_{refer}$ detected by the detector 248. Thus, the magnitude of the light detected by the detector 248 can be multiplied by a constant factor (e.g., 99) to determine the magnitude of the light $I_{in}$.

The grating reflector 100 will reflect a portion of the light $I_{in}$ in the reverse or backward direction as indicted by the arrow $I_{reflec}$. This light $I_{reflec}$ will propagate back to port B of the coupler 230 where approximately 99 percent of it will continue in the fiber 120 and will propagate back towards the polarization controller 220. Approximately one percent of the light $I_{reflec}$ will be coupled to the fiber 240 and will exit via the port C of the coupler 230 and propagate to the first end 242 of the fiber 240 where it will be detected by the detector 246. The coupled light which propagates to the end 242 is represented by an arrow $I_{meas}$. The magnitude of the light $I_{meas}$ will be directly proportional to the magnitude of the light $I_{reflec}$ and the magnitude of the reflected light $I_{reflec}$ can thus be determined by multiplying the magnitude of the measured light $I_{meas}$ by a constant (e.g., 100). A portion of the light $I_{in}$ input to the grating reflector 100 continues to propagate in the same direction in the fiber 120, exits the grating reflector 100, and propagates to the end 250 of the fiber 120 where it is detected by the detector 252. This light, represented by the arrow $I_{trans}$ is the light transmitted by the grating reflector 100. The magnitude of the transmitted light $I_{trans}$ is equal to the input light $I_{in}$ less any light lost in the grating reflector 100 less the reflected light $I_{reflec}$. As will be shown below, for the metallic grating reflector, the magnitudes of the transmitted light $I_{trans}$ and the reflected light $I_{reflect}$ vary with the polarization of the light as well as with the wavelength.

The results of an exemplary test using the setup shown in FIG. 6 with a metallic reflective grating 150 are graphically illustrated in FIGS. 7 and 8 for TM and TE polarization, respectively. In both figures, the horizontal axis is the wavelength of the light from the light source 200 and the vertical axis is the fraction of the measured power $P_R$ of reflected light $I_{reflec}$ divided by the measured power $P_I$ of input light $I_{in}$. The measurements are taken at the detectors 248 and 246 respectfully, and the measured magnitudes of the process are multiplied by the appropriate factor to obtain the results illustrated in FIGS. 7 and 8.

As shown in FIG. 7, for the TM polarization, the reflectivity of the grating reflector 100 of the present invention is very wavelength dependent with maximum reflection of approximately 38 percent of the incident light occurring at the calculated wavelength of 8082 Angstroms. This wavelength will be referred to hereinafter as the resonant wavelength (i.e., the wavelength which matches the spatial periodicity of the grating). The 3 db bandwidth of the grating reflector (i.e., the bandwidth where the measured intensity of the reflected light is greater than or equal to one-half of the maximum measured intensity) is approximately 2.8 Angstroms. Thus, it can be readily seen that the present invention can be used as a wavelength-dependent filter which reflects only that light within a very narrow bandwidth, and thus can be used as a band-pass filter for TM polarized light.

As shown in FIG. 8, the maximum intensity of the reflected light for TE polarization is less than one-half of one percent, compared to the 38% reflection for TM polarization. However, the percentage of reflected light for TE polarization is also very wavelength-dependent with the 3 dB bandwidth being approximately 1.8 Angstroms. It is believed that the substantial difference in the reflectivities of the light travelling in the two polarization modes (i.e., TM and TE) is caused by the orientation of the electric and magnetic fields relative to the grating 150. Maximum reflection occurs when the magnetic field is parallel to the metallic surface and the electric field is perpendicular to the metallic surface, as is the case for the TM polarization. Conversely, minimum reflection occurs when the electric field is parallel to the metallic surface and the magnetic field is perpendicular to the metallic surface, as in the TE polarization.

The transmission characteristics of the grating reflector 100 were also measured using the setup in FIG. 6 by measuring the intensity of the light $I_{trans}$ at the second end 250 of the optical fiber 120. At wavelengths near the resonant wavelength, it was discovered that the intensity of the transmitted optical signal $I_{trans}$ varied inversely with the intensity of the reflected optical signal $I_{reflec}$ as would be expected. At the maximum reflectivity of 38 percent for TM polarization, the fraction of light transmitted to the detector 252 was approximately 3 percent of the light $I_{in}$ input to the grating reflector 100, indicating that approximately 59 percent of the light $I_{in}$ input to the grating reflector 100 was lost. Such losses are believed to be a result of absorption of the TM polarized light by the metal of the grating and not due to stray coupling to unguided modes of the fiber. This has been experimentally verified by propagating longer wavelengths of light which exhibit little phase matching, but which are also attenuated by approximately 50 percent. At the maximum reflectivity of approximately 0.45 percent for TE polarization, the transmission of the input light $I_{in}$ through the reflector 100 was approximately 98 percent.

Since the transmission of the light $I_{in}$ input to the reflector 100 can be varied from approximately 98 percent to approximately 3 percent by varying the polarization of the light, the grating reflector can be used as a polarization-dependent transmission filter which provides a transmission extinction ratio ($ER_{trans}$) of approximately 15 dB between the transmissivity of light at the two polarizations. The transmission extinction ratio is the ratio of the percent of the TE polarization which is transmitted (i.e., %trans-TE) to the percent of the TM polarization which is transmitted (i.e., %trans-TM) and is expressed in decibels as follows:

$$ER_{trans} = 10 \log_{10} \frac{\% \text{ trans-}TE}{\% \text{ trans-}TM}$$

Similarly, the grating reflector provides a polarization-dependent reflection filter having reflection extinction ratio $ER_{reflec}$ of greater than 19 dB between the two polarization modes. The reflection extinction ratio is the ratio of the percent of the TM polarization which is reflected (i.e., % reflec-TM) to the percent of the TE polarization which is reflected (i.e., % reflec-TE) and is expressed in decibels as follows:

$$ER_{reflec} = 10 \log_{10} \frac{\% \text{ reflec-}TM}{\% \text{ reflec-}TE}$$

Figure 9:
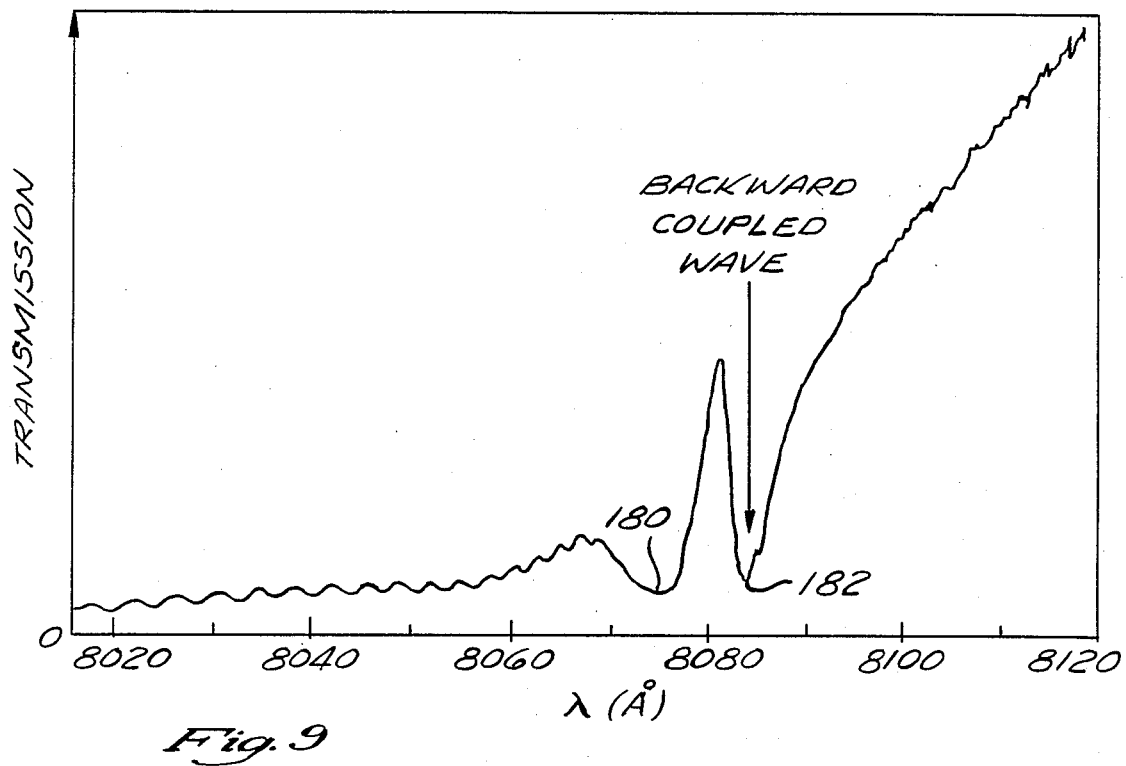
FIG. 9 is a graphical representation of the percentage of transmission of an optical signal propagating in the transverse magnetic (TM) polarization mode as a function of the wavelength of the optical signal.

FIG. 9 graphically illustrates the transmission characteristics of the grating reflector 100 through a broad wavelength spectrum for the metallic grating 150 and the TM polarization of light. At wavelengths below the resonant wavelength of 8082 Angstroms, the transmission of the input light is on the order of a few percent. At wavelengths above the resonant wavelength, the percentage of transmission increases very rapidly. The low percentage of transmission below the resonant wavelength can be explained by the metallic grating providing phase matching to unguided radiation modes. Just below the resonant wavelength, there is a minimum of transmission (indicated by reference designator 180) which is believed to be caused by coupling of light from the first order $LP_{01}$ mode to the second order $LP_{11}$ mode. Those skilled in the art will understand that the $LP_{11}$ mode will propagate in the fiber 120 only if the wavelength of the light in this mode is below the cutoff wavelength of the fiber 120. In the experimental setup described in reference to FIGS. 6 and 9, the fiber 120 used for testing had a cut-off wavelength of 7450 Angstroms for the $LP_{11}$ mode. Thus, for wavelengths above 7450 Angstroms, the fiber 120 will not support the $LP_{11}$ mode. Accordingly, light reflected in the $LP_{11}$ mode at wavelengths above the cut-off wavelength will not be detected by the detector 246 (FIG. 6) because the $LP_{11}$ mode is a leaky mode for the wavelengths used in the test in FIG. 6, and are not supported by the fiber 120. A transmission minimum (indicated by reference designator 182) on the longer wavelength side of 8080 Angstroms is caused by the maximum reflection of the incident light into the reverse or backward guided mode ($LP_{01}$) at the resonant wavelength of 8082 Angstroms, as explained above. Thereafter, with increasing wavelengths, the transmission percentage increases to a maximum percentage determined by the attenuation of the metallic grating which was experimentally determined to be approximately 50 percent. Thus, the reflection grating 100 of the present invention using the metallic grating 150 acts as a long-pass filter for transmission of the TM polarization in contrast to acting as a band-pass filter for reflection of the TM polarization.

Figure 10:
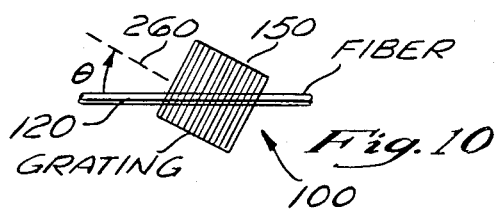
FIG. 10 is a pictorial representation of the metallic reflection grating positioned at an angle $\theta$ with respect to the axis of propagation of the optical fiber.
Figure 11:
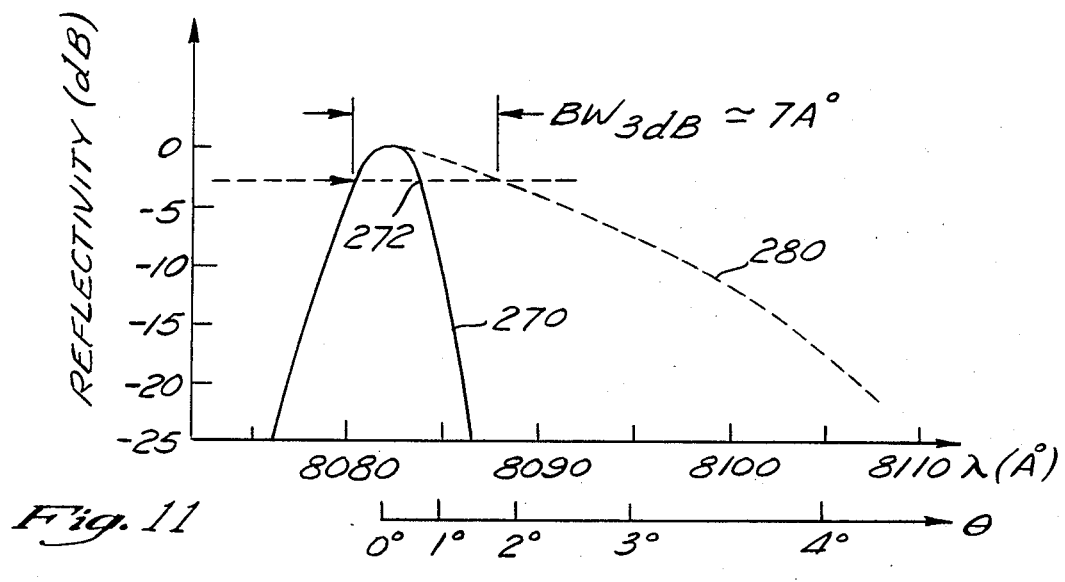
FIG. 11 is a graphical representation of the amount of reflection of an optical signal as a function of the angle $\theta$ of the reflection grating with respect to the axis of propagation of the optical fiber.

The metallic grating reflector 100 exhibits a small degree of tunability which can be shown by rotating the metallic grating 150 through an angle $\theta$ with respect to the axis of the fiber 120 as illustrated in FIG. 10. The angle $\theta$ is measured between the axis of the fiber 120 and a line 260 normal to the ridges and grooves of the metallic grating 150. Thus, an angle $\theta$ of 0-degrees represents the preferred embodiment with the ridges and grooves perpendicular to the axis of the fiber 120. FIG. 11 graphically represents the wavelength response of the grating reflector 100 at varying angles of $\theta$. The horizontal scale shows the wavelength of the light input to the grating reflector in Angstroms and also shows the angle $\theta$ in degrees. The vertical scale shows the relative reflectivity of the grating reflector 100 in decibels (dB). When the metallic grating 150 is positioned at an angle of 0 degrees, the reflectivity of the device will be at a maximum at the resonant wavelength of 8082 Angstroms, as illustrated by a curve 270 shown as a solid line in FIG. 11 which generally corresponds to the curve in FIG. 7. This point of maximum reflectivity is shown on the vertical scale as 0 dB. All other measurements of reflectivity are referenced to the 0-dB reflectivity at $\theta$ equal to 0 degrees and the wavelength equal to 8082 Angstroms.

The curve 270 thus peaks at 0 dB for the resonant wavelength of 8082 Angstroms and has negative dB values for wavelengths above and below the resonant wavelength. For example, the curve 270 indicates that at the nonresonant wavelength of approximately 8084 Angstroms, the reflectivity is $-3$ dB relative to the reflectivity at the resonant wavelength (i.e., the reflectivity at 8084 Angstroms is approximately 50 percent of the reflectivity at 8082 Angstroms). The intersection of the $-3$ dB reflectivity with the curve 270 is labelled with a reference designator 272.

As the angle $\theta$ in FIG. 10 is increased, the resonant wavelength increases, while the reflectivity at the resonant wavelength decreases. This effect of varying the angle $\theta$ is illustrated in FIG. 11 by the dashed curve 280, which represents resonant wavelength reflectivity as a function of both the angle $\theta$ and the resonant wavelength. For example, at $\theta$ equal to 2 degrees, the resonant wavelength shifts upwardly (to the right in FIG. 11) so that the maximum reflectivity occurs at approximately 8089 Angstroms. This reflectivity at the shifted resonant wavelength is approximately $-4$ dB (i.e., the reflectivity at $\theta$ equal to 2 degrees and the wavelength equal to 8089 Angstroms is approximately 40 percent of the reflectivity at 0 degrees and 8082 Angstroms). Further increases in the angle $\theta$ causes the resonant wavelength to be shifted further upward (i.e., to the right in FIG. 11) until at $\theta$ approximately equal to 4 degrees the resonant wavelength is approximately 8105 Angstroms and the reflectivity at that wavelength is $-20$ dB relative to the maximum reflectivity at $\theta$ equal to 0 degrees and the wavelength equal to 8082 Angstroms (i.e., the maximum reflectivity at $\theta$ equal to 4 degrees is 0.01 times the maximum reflectivity at $\theta$ equal to 0 degrees). If a reflectivity of 50 percent (i.e., $-3$ dB) of the maximum reflectivity is taken as the useable limits of tunability, then the device is tunable from approximately 8081 Angstroms at $\theta$ equal to 0 degrees to 8088 Angstroms at $\theta$ approximately equal to 1.8 degrees. Thus, the grating reflector 100 using the metallic grating 150 has a tunable 3-dB bandwidth of approximately 7 Angstroms.

In especially preferred embodiments of the present invention, the use of a grating photolithographically etched directly on the facing surface 140 of the optical fiber 120 as described above in connection with FIGS. 5a and 5b improves the reflectivity of the device significantly since the losses associated with the metallic surface are no longer present. Thus, this device yields higher percentages of reflections at the resonant wavelength than the metallic grating devices. Similarly, since there is no metal, the transmission will be substantially higher at wavelengths above and below the resonant bandwidth of the device. Such photolithographically etched devices are thus particularly well-suited for use as wavelength-dependent filters. The absence of metal in the photolithographically etched devices also substantially reduces the polarization dependency of the devices.

The evanescent field grating reflector of the present invention can also be advantageously used with multimode fibers to couple light from a first mode to a second mode. For example, in a two-mode fiber, a light signal propagating in a forward direction in the second order propagation mode ($LP_{11}$) at a wavelength $\lambda_2$ can be reflected by the evanescent field grating reflector and propagate in the reverse direction in the same fiber at a wavelength $\lambda_1$. The light signal will propagate in the first order mode ($LP_{01}$) in the reverse direction. It has been found that the spatial periodicity $\Lambda$ of the grating reflector required to couple between the higher order mode and the lower order mode should be selected as follows:

$$\frac{1}{\Lambda} = \frac{1}{\lambda_1} + \frac{1}{\lambda_2}$$

where $\lambda_1$ is the propagation wavelength of the lower order mode in the optical fiber and $\lambda_2$ is the propagation wavelength of the higher order mode in the optical fiber. The foregoing equation can also be expressed as follows:

$$\frac{1}{\Lambda} = \frac{n_{m1}}{\lambda_0} + \frac{n_{m2}}{\lambda_0}$$

where $\lambda_0$ is the free space wavelength of the light propagating in the fiber, $n_{m1}$ is the equivalent refractive index of the fiber for light propagating in the lower order mode, and $n_{m2}$ is the equivalent refractive index of the fiber for light propagating in the higher order mode. For an optical fiber having a few modes (i.e., 2-10 modes), signals can be coupled from lower order modes to higher order modes as well as from higher order modes to lower order modes.

What is claimed is:

1. An intermode coupling apparatus for coupling an optical signal travelling in a first mode of a multimode optical fiber to a second mode of said fiber, said optical signal having a vacuum wavelength ($\lambda_0$), said apparatus comprising:
   a length of multimode optical fiber having an inner core and an outer cladding and having a facing surface on said cladding in close proximity to said core such that an evanescent field of said optical signals penetrates said facing surface; and
   a periodic grating structure on said cladding facing surface within the evanescent field of said optical signal propagating in said first mode, said grating structure having a periodicity $\Lambda$ in accordance with the following expression:

$$\frac{1}{\Lambda} = \frac{n_{m1}}{\lambda_0} + \frac{n_{m2}}{\lambda_0}$$

wherein $n_{m1}$ is the effective refractive index of the optical fiber for light propagating in said first mode and $n_{m2}$ is the effective refractive index of the optical fiber for light propagating in said second mode.

2. The intermode coupling apparatus defined by claim 1, wherein said grating structure comprises grooves formed in said cladding.

3. The intermode coupling apparatus as defined in claim 2, wherein said grooves have a width in the direction of propagation of said optical signal substantially equal to $\Lambda/2$.

4. The intermode coupling apparatus as defined in claim 2, wherein the grooves are spaced apart by ridges having a width in the direction of propagation of said optical signal substantially equal to $\Lambda/2$.

5. The intermode coupling apparatus as defined in claim 2, wherein said grooves are formed in said cladding by etching said cladding.

6. The intermode coupling apparatus as defined in claim 1, wherein said grating structure comprises a holographic reflection grating having a plurality of parallel ridges positioned on said cladding facing surface.

7. The intermode coupling apparatus as defined in claim 6 wherein said ridges are periodically spaced from each other by said distance $\Lambda$.

8. The intermode coupling apparatus as defined by claim 6, further comprising an index matching oil applied between said cladding facing surface and said holographic reflection grating.

9. The intermode coupling apparatus as defined by claim 8, wherein pressure is applied to said holographic reflection grating to ensure contact between said ridges and said cladding facing surface.

10. A method of manufacturing an apparatus for coupling optical energy between a first optical propagation mode and a second optical propagation mode comprising the steps of:
    providing a facing surface on the cladding of a multimode optical fiber having an inner core and an outer cladding to expose the evanescent field of an optical signal propagating therein; and
    placing a periodic grating structure on said cladding at said facing surface, said periodic grating structure having a periodicity $\Lambda$ in accordance with the following expression:

$$\frac{1}{\Lambda} = \frac{n_{m1}}{\lambda_0} + \frac{n_{m2}}{\lambda_0}$$

where $n_{m1}$ is the effective refractive index of the optical fiber for optical energy propagating in said first propagation mode, $n_{m2}$ is the effective refractive index of the optical fiber for optical energy propagating in said second propagation mode, and $\lambda_0$ is the vacuum wavelength of the optical signal to be coupled.

11. The method as defined in claim 10, wherein said placing step comprises the step of positioning a holographic grating reflector on said facing surface, said holographic grating reflector having a spatially periodic series of ridges that are positioned in contact with said facing surface.

12. The method as defined in claim 11, further comprising the step of placing an index matching oil on said facing surface prior to placing said holographic grating reflector on said facing surface.

13. The method as defined in claim 11, further comprising the step of applying pressure to the holographic grating reflector to ensure contact between said holographic grating reflector and said facing surface.

14. The method as defined in claim 10, wherein said placing step comprises the step of etching said facing surface to form a series of grooves thereon, spaced apart by a series of ridges, said grooves and ridges having a periodicity of $\Lambda$.

15. The method as defined in claim 10, wherein said facing surface is formed by removing cladding from said fiber.

16. An intermode coupling apparatus for coupling an optical signal travelling in a first mode of a mutlimode optical fiber to a second mode of said fiber, said apparatus comprising:
    a length of multimode optical fiber having an inner core and an outer cladding and having a surface on said cladding in close proximity to said core such that an evanescent field of said optical signal penetrates said surface; and
    means on said surface of said cladding within the evanescent field of said optical signal for reflecting light from said first mode into said second mode such that the reflected light propagates in said second mode.

17. The intermode coupling apparatus as defined in claim 16, wherein said reflecting means comprises a grating having a plurality of parallel ridges positioned on said surface.

18. A method of intermode coupling, comprising:
    propagating a signal in a first mode of a length of multimode optical fiber having two modes, said fiber having first and second ends; and
    reflecting said signal from said first mode into a second mode of said optical fiber at a location intermediate said ends such that said signal propagates in said second mode.

19. An intermode coupling apparatus for coupling an optical signal travelling in a first mode of a multimode optical fiber to a second mode of said fiber, said apparatus comprising:

a length of multimode optical fiber having an inner core and an outer cladding and having a surface on said cladding in close proximity to said core such that an evanescent field of said optical signal penetrates said surface; and a periodic structure within the evanescent field of said optical signal, said structure adapted to reflect light from said first mode into said second mode such that the reflected light propagates in said second mode.

* * * * *